June 8, 1937.   T. A. CASTRIANA   2,083,429
MACARONI GUITAR
Filed May 12, 1936
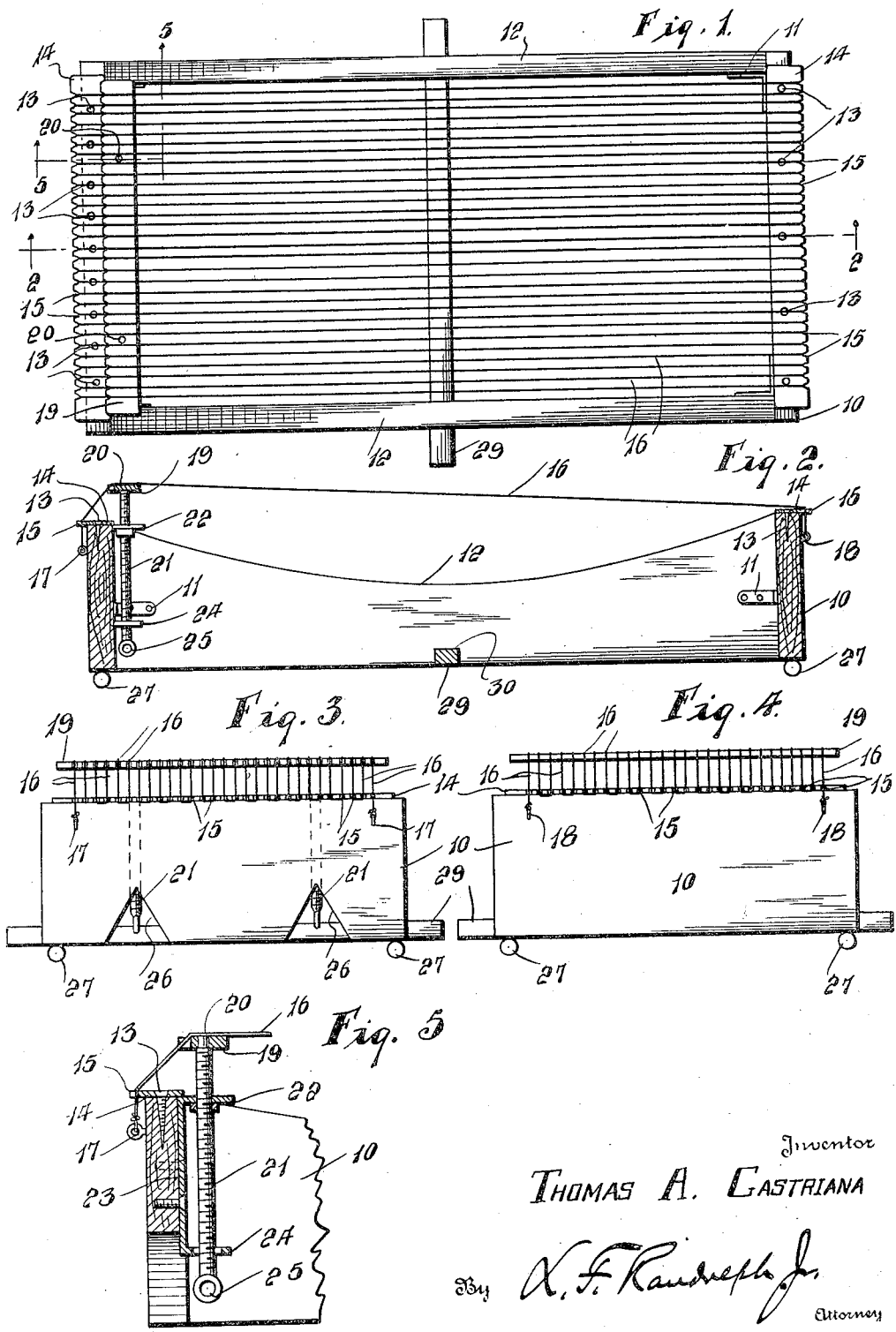
Inventor
THOMAS A. CASTRIANA
By [signature]
Attorney Patented June 8, 1937

2,083,429

UNITED STATES PATENT OFFICE 2,083,429

MACARONI GUITAR

Thomas A. Castriana, Ossining, N. Y.

Application May 12, 1936, Serial No. 79,353

5 Claims. (Cl. 107—20)

This invention relates to a guitar or cutter for macaroni, spaghetti or similar products.

It is aimed to provide a novel construction utilizing a wire arranged with a multiplicity of portions thereof in parallelism and equidistantly spaced apart in combination with novel means for placing such portions under the desired tension so that dough may be pressed therethrough in order to be cut or formed into the desired shape.

The more specific objects and advantages will become apparent from a consideration of the description following taken in connection with accompanying drawing illustrating an operative embodiment.

In said drawing:—

Figure 1 is a plan view of the improved device;

Figure 2 is a longitudinal sectional view taken on the line 2—2 of Figure 1;

Figure 3 is an end elevation looking from the left in Figure 2;

Figure 4 is an end elevation looking from the right in Figure 2, and

Figure 5 is an enlarged detail section taken on the line 5—5 of Figure 1.

Referring specifically to the drawing, a suitable frame, preferably rectangular, is provided at 10, being made for instance of white pine or other wood nailed or otherwise fastened together and suitably braced by brackets if desired as at 11. The upper edges of the sides of the frame are preferably concave as shown at 12.

Suitably screwed or otherwise fastened as at 13 across the top of the end wall of the frame are comb bars 14 which may be made of copper. Such bars have equidistantly spaced notches 15 and a metallic wire 16 of any suitable thin gauge is strung back and forth and secured by the notches 15, the wire being usually in a single length and having its terminal fastened as at 17 in eyelet 18 secured to one of the end walls of the frame.

In order to maintain the parallel portions of the wire 16 sufficiently taut or under the desired tension, they pass over a tensioning bar 19 in which the upper reduced end 20 of screw rods 21 are journaled. Such rods 21 are screw-threaded to horizontal portions 22 of brackets 23 having additional horizontal portions 24, provided with openings through which the screw rods 21 loosely pass and in which they are guided.

Adjacent the lower ends of the rods 21, which are provided with openings 25, the end wall of the frame 10 is cut away as at 26, to render the portions 25 accessible for turning or for the insertion of a tool into the openings 25 to effect the turning.

Also adjacent the corners of the frame, rubber tips or feet 27 may be provided on the frame.

In the use of the device, the dough or material to be cut into macaroni or spaghetti form is placed across the taut portions of the wire 16 and a roller is then passed over the dough, causing it to pass through the wires, being cut thereby. The wire may be maintained under the desired tension through the adjustment of the screw rods 21.

Attention is called to the fact that a cross bar 29 is removably and frictionally held in notches 30 in the lower edge of the sides of frame 10. The macaroni or spaghetti will fall across such bar and the bar may thereupon be removed with the macaroni or spaghetti straddling the same. Also the removability of the bar enables it to be arranged inside of the frame during transportation of the apparatus.

I claim as my invention:—

1. A device of the class described comprising a frame, bars on said frame, a wire strung in parallel strands anchored on said bars, means operable to place said strands under tension, said frame in its lower edge having notches, and a bar removably disposed in said notches at an angle to said strands so that the material will straddle the bar through its movement after disengaging said strands.

2. A device of the class described comprising a frame, bars on said frame having notches, a wire strung in parallel strands anchored in said notches, and means operable to place said strands under tension and a removable bar on the frame at an angle to the said strands and arranged below the same so that the material cut will straddle the bar.

3. A device of the class described comprising a frame, bars on said frame having notches, a wire strung in parallel strands anchored in said notches, and means operable to place said strands under tension including a tensioning bar engaging said strands, and screw rods mounted on the frame and journaled in said tensioning bar.

4. A device of the class described comprising a frame, bars on said frame having notches, a wire strung in parallel strands anchored in said notches, and means operable to place said strands under tension, comprising a tensioning bar below and in engagement with said strands, screw rods journaled at their upper ends in said tensioning bar, brackets on the frame having screw-threaded portions engageable by the rods, said frame being cut away adjacent the lower ends of the rods to facilitate engagement of the latter.

5. A device of the class described comprising a frame, parallel strands on the frame to cut macaroni or the like, and a bar on the frame below the strands, said bar being at an angle to the strands so that the material will straddle the bar upon leaving the strands, and means mounting said bar on the frame for disengagement from the latter through movement in a plane substantially perpendicular with respect to the frame.

THOMAS A. CASTRIANA.